United States Patent [19]

Mannheim

[11] Patent Number: 5,622,580
[45] Date of Patent: Apr. 22, 1997

[54] METHOD OF FORMING A CURVED, SHATTERPROOF GLASS LAMINATE

[76] Inventor: Jose R. Mannheim, Calle 14 N. 35-39, Bogota, Colombia

[21] Appl. No.: 390,863

[22] Filed: Feb. 17, 1995

Related U.S. Application Data

[60] Division of Ser. No. 170,740, Dec. 21, 1993, abandoned, which is a continuation-in-part of Ser. No. 999,525, Dec. 30, 1992, abandoned.

[51] Int. Cl.⁶ .................... B32B 31/12; B30B 15/02; C03C 27/12
[52] U.S. Cl. .................... 156/106; 156/104; 156/285; 156/295; 156/580; 100/295
[58] Field of Search ............... 156/99, 104, 106, 156/295, 285, 580, 583.1, 581; 100/93 P, 295

[56] References Cited

U.S. PATENT DOCUMENTS

| | | | |
|---|---|---|---|
| 2,725,319 | 11/1955 | Tarnopol | 156/104 X |
| 3,806,387 | 4/1974 | Peetz et al. | 156/102 |
| 3,933,552 | 1/1976 | Shumaker | 156/104 |
| 3,960,627 | 6/1976 | Halberschmidt | 156/104 |
| 4,041,208 | 8/1977 | Seeger et al. | 428/425.6 |
| 4,123,588 | 10/1978 | Molari, Jr. | 428/215 |
| 4,126,730 | 11/1978 | Molari, Jr. | 428/215 |
| 4,232,080 | 11/1980 | Orain et al. | 428/215 |
| 4,362,587 | 12/1982 | Baudin et al. | 156/104 X |
| 4,425,406 | 1/1984 | Palma | 156/104 X |
| 4,470,858 | 9/1984 | McMaster | 156/104 X |
| 4,945,002 | 7/1990 | Tanuma et al. | 428/425.6 |
| 4,952,457 | 8/1990 | Cartier et al. | 428/425.6 |
| 5,002,820 | 3/1991 | Bolton et al. | 428/215 |

*Primary Examiner*—Michael W. Ball
*Assistant Examiner*—Francis J. Lorin
*Attorney, Agent, or Firm*—Jacobson, Price, Holman & Stern, PLLC

[57] ABSTRACT

A method of making a curved, shatterproof glass laminate for an automotive orother type transportation vehicle window or sun roof, which comprises at least one heat tempered or heat strengthened glass layer, which may be a low E glass type, at least one internal combination elastic shock absorbing-adhesive plastic layer of, for example, polyvinyl butyral material, and at least one antilacerative plastic layer of, for example, polyester or polycarbonate material, and/or a polyester material having a scratch-resistant or self-healing coating. The laminate may be formed from a laminate layup by engaging the antilacerative layer with a mold member and subjecting the resultant assembly to vacuum, heat and pressure in an autoclave. The resultant laminate may have a thickness so as to be readily usable for replacement or new manufacture in a standard existing frame or holder. The mold member is formed of a relatively thin hard plastic, such as a polyester or a polycarbonate, a relatively thin metal, such as stainless steel, or be of a normally flat planar elastic, flexible resin-impregnated fiber glass construction which does not require premolding. When two glass layers are used, they may be bonded together by a liquid adhesive to compensate for curved shape variations in the layers.

14 Claims, 2 Drawing Sheets

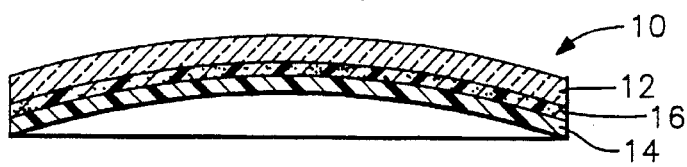
FIG. 1
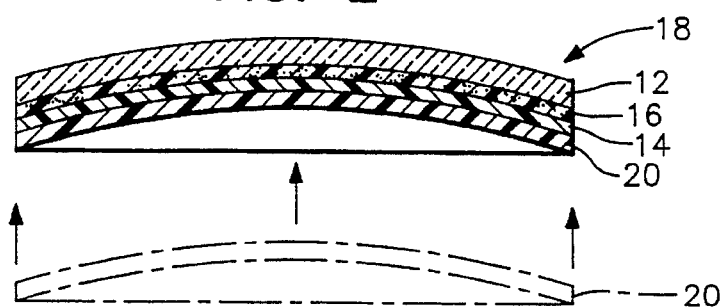
FIG. 2
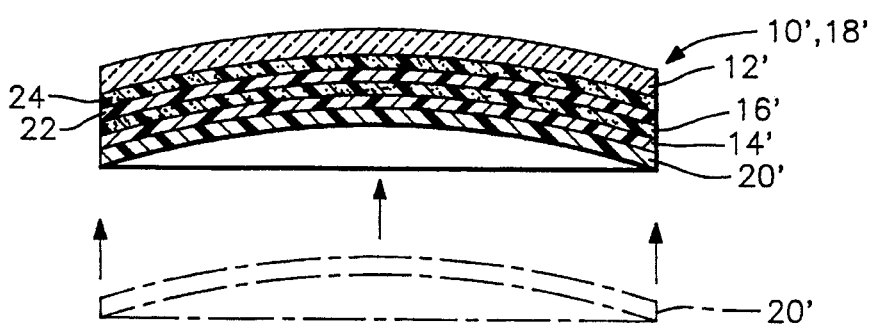
FIG. 3
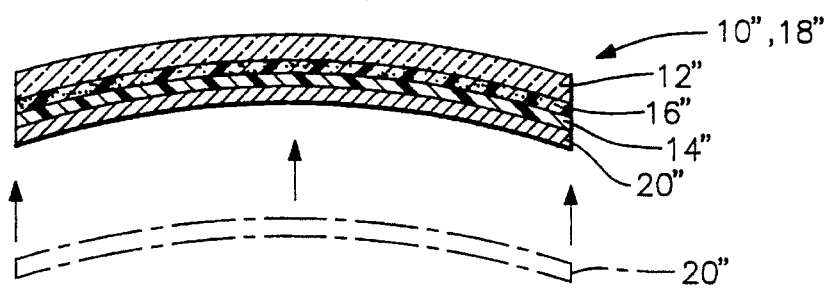
FIG. 4
FIG. 5
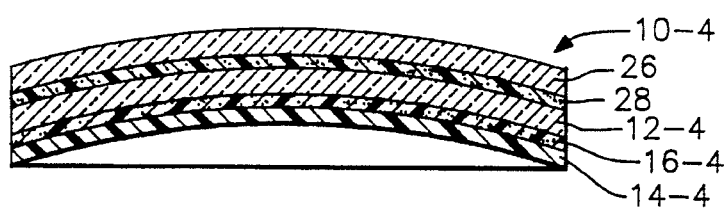

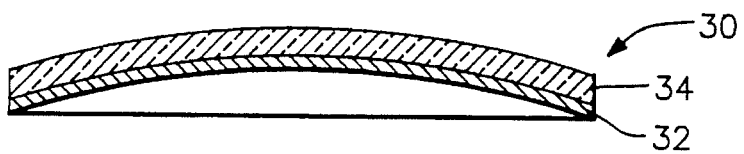
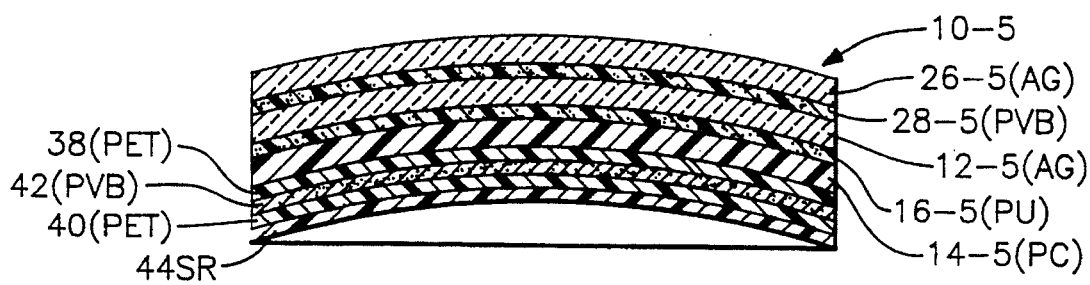
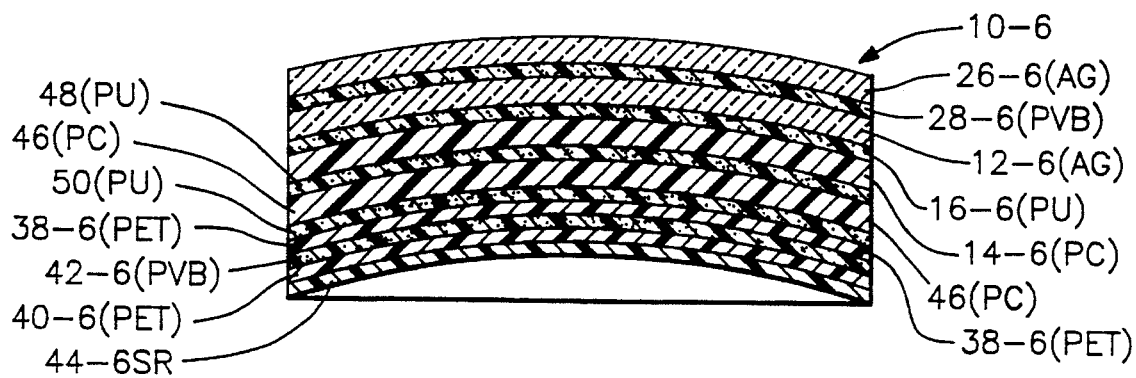
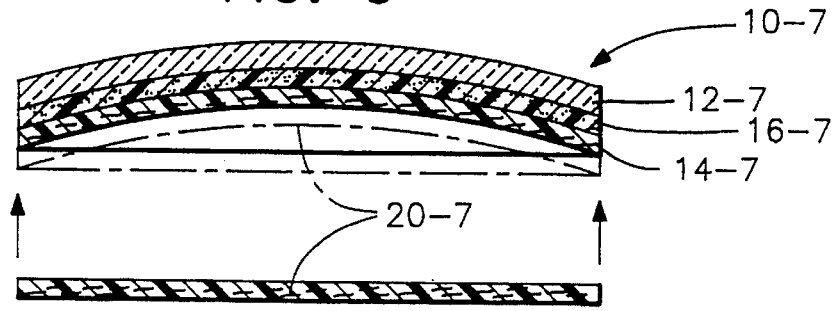

METHOD OF FORMING A CURVED, SHATTERPROOF GLASS LAMINATE

This is a divisional of application Ser. No. 08/170,740 filed Dec. 21, 1993, now abandoned, which is itself a continuation-in-part of application Ser. No. 07/999,525 filed Dec. 30, 1992, now abandoned.

BACKGROUND OF THE INVENTION

1. Field of the Invention

This invention relates generally to a curved, shatterproof glass laminate, wherein at least one glass layer of the laminate is selected from the group consisting of heat tempered, heat strengthened and annealed glass, and a method of forming the laminate, and more particularly to a curved, shatterproof glass laminate for use in the form of an automotive or other transportation vehicle windshield, side window, back window or sun roof, and a method of forming the laminate precisely and economically in large quantities, with excellent optical qualities and other desirable physical characteristics, utilizing a rigid, structurally stable, quick-releasable and reusable hard plastic or metal mold member, or an elastic, flexible resin-reinforced fiber glass mold member.

2. Description of Related Art

At the present time, it is standard practice to make windshields of automotive vehicles of shatterproof construction to prevent injury to a vehicle occupant in the event of a collision, particularly as a result of the occupant's head moving forward and striking the windshield. Typically, a windshield may be constructed in the form of a curved laminate comprising a plastic shock or energy absorbing-adhesive layer between two silicate glass layers. It also is known to provide an antilacerative plastic layer on the interior glass layer of the windshield to prevent occupant injury from glass shards or splinters. In another form, the windshield may comprise an outer silicate glass layer, an adhesive inner layer and an interior-facing plastic layer.

However, a serious problem exists in known windshields, and in particular, the type of windows still generally used in automotive and other transportation vehicles, such as buses, trucks and trains, i.e., the side windows and/or back windows, and including sun roofs, in that these windows still are readily subject to breakage, either as a result of a collision and/or vandalism. For example, the side windows, which are those generally chosen by vandals for obtaining access into the vehicle, generally are formed of a single sheet of heat tempered glass. Further, when one of these windows is shattered, either in a collision or by a hammer, iron bar, rock or other manual weapons, splinters and shards of glass tend to be propelled into the interior of the vehicle, with possible serious injury to the occupant(s). The ease with which such a window can be shattered also invites widespread vandalism and/or personal attacks upon the vehicle occupant(s), including shooting through the window, further contributing to the problem of individual personal safety.

Accordingly, a particular need exists for a vehicle window which is substantially more resistant to impact, including gun shots, does not shatter and propel glass fragments into the interior of the vehicle, has excellent optical qualities and other desirable physical characteristics, and is of a configuration and thickness such that it readily can be mounted in an existing vehicle window frame or holder for either replacement or new manufacture purposes, without any substantial modification of the existing frame or holder.

A primary purpose of the subject invention, therefore, is to provide a new and improved curved, shatterproof glass laminate construction in the form of a windshield or a vehicle window, such as a side window, back window or sun roof, and a new and improved method of forming the laminate, which satisfy these criteria.

In general, as noted previously, the forming of curved glass-plastic laminates is known. For example, U.S. Pat. No. 3,806,387 to Peetz et al. discloses the forming of a bent or curved safety glazing or laminate for a windshield, comprising a sheet of ordinary silicate glass, an adhesive layer such as a sheet of polyvinyl butyral resin, and a plastic sheet of cellulose acetate butyrate. To improve the optical qualities of the formed laminate, a curved protective member in the form of a second glass sheet, having a configuration conforming to that of the first glass sheet, is positioned in pressure engagement with the plastic sheet, in combination with a demolding agent. The resultant assembly then is subjected to vacuum degasification, heat and pressure in an autoclave to form the laminate, after which the glass protective member is removed.

In the U.S. Pat. No. 3,933,552 to Shumaker, a laminated safety glass panel is disclosed, comprising sheets of rigid transparent material, such as glass, polycarbonate, polyester and the like, alternating with interlayer materials, such as polyvinvyl butyral, polyurethane and the like. The sheets of transparent material are subjected to a preprocessing method which involves a combination of roll pressing and peripheral evacuation. The preprocessing occurs prior to a final laminating step wherein the preprocessed assembly is subjected to elevated temperature and pressure while in an autoclave. The patent further suggests that the assembly may include additional alternate layers of relatively rigid transparent material and relatively flexible material to provide an assembly of more or less than three layers to be laminated to form a transparent safety window closure. Further, it is indicated that one or more of the rigid transparent sheets of glass may be made of any of the commonly known glass substitutes such as polycarbonates, acrylic plastic, polyesters and the like. The laminated structure can also include tempered glass.

U.S. Pat. No. 3,960,627 to Halberschmidt et al. involves a glazing or laminate including a sheet of glass and a sheet of plastic adhesively fastened thereto, and represents an improvement over the use of the contoured glass protective member of the above-mentioned Peetz et al. patent. It is indicated that a glass protective member is undesirable for various reasons, including a tendency to adhere to the laminate being formed, resulting in damage to the laminate and/or the mold member during a separation process, and/or susceptibility to breakage, so as to be incapable of reuse. The improvement over the Peetz et al. arrangement involves replacing the rigid glass protective member by a composite protective layer that is flexible. More specifically, the laminate is manufactured by assembling into a stack, a sheet of glass, which may be tempered, a sheet of plastic, and the composite protective layer comprising a thin flexible protective sheet and a thick cushion sheet, with the combined sheet thickness being in a range on the order of 6 to 33 mm. The stack is enclosed in a bag of rubber or similar flexible material which is evacuated to degas the stack. The bag with the stack therein is then subjected to heat and pressure in an autoclave to bond together the glass and plastic sheets, whereafter the protective and cushion sheets can be separated from the remainder of the stack.

U.S. Pat. No. 4,232,080 to Orain et al. discloses a safety window comprising at least one sheet of glass, which may be tempered, and on the other side thereof facing the interior of the vehicle in which the window is to be mounted, a sheet of transparent, elastic plastic material, such as aliphatic polyurethane, bonded adhesively to the glass sheet. According to the patent, a prior art embodiment also includes a sheet of tempered glass having bonded thereto a sheet of plastic material such as polycarbonate, polyacrylate, cellulose acetate, polyester, polyvinylchloride or the like.

In the U.S. Pat. No. 5,002,820 to Bolton et al., an anti-spalling laminated safety glass is disclosed, comprising a relatively thick front lamina, a back glass lamina, and an intermediate resinous bonding layer. Any of a number of known resins can be used as outer laminae, tempered glass can be used as a glass layer, and solid resinous materials which can be used include polyesters and ABS plastics. Furthermore, an interlayer can include rigid plies of coated or uncoated glass, polycarbonate, acrylic or polyester, and/or flexible plies of polyurethane, other esters commonly used as interlayer materials, and polyvinyl butyral resin.

SUMMARY OF THE INVENTION

In general, the invention relates to a curved, shatterproof glass laminate and a method of forming the laminate, which comprises providing a laminate layup by arranging at least one curved sheet or layer of glass selected from the group consisting of heat tempered glass, heat strengthened glass and annealed glass, and at least one curved antilacerative sheet or layer of plastic in superimposed relationship with an inner layer of adhesive therebetween. The laminate then is formed into an integral product using a mold member, in a vacuum under heat and pressure.

For example, a rigid, hard, structurally stable and curved mold member, of a material which will not adhere to the plastic layer of the formed laminate, such as plastic or metal, and having the same curvature and topography as the layer of the curved glass, may be assembled in pressure engagement with the curved antilacerative plastic layer to form and protect it against deformation, while also preventing the formation of air pockets in the adhesive, during subsequent heating. The laminate layup-mold member assembly then is subjected to a vacuum, followed by heating under pressure for a preselected time period, and then cooling, whereupon the mold member readily is removed from the formed laminate, which is of a curved shatterproof and antilacerative construction, and which has excellent optical qualities and other desirable physical characteristics. In the alternative, the mold member may be of a flat planar elastic, flexible construction which adapts to the configuration of the curved glass under the pressure of the autoclave, and does not require premolding, such as a resin-reinforced fiber glass material.

More specifically, the curved antilacerative plastic sheet of the laminate layup may be a polyester, polyurethane, polyacrylate, cellulose acetate or polycarbonate material, having a scratch resistant or self-healing coating. The inner layer may be a sheet of plastic having both shock or energy absorbing and adhesive characteristics, such as polyvinyl butyral, polyurethane, an ethylene-vinyl acetate copolymer (EVA), an ethylene-vinyl acetate triallyl isocyanurate terpolymer (EVAT), or another adhesive with similar characteristics. Additional internal antilacerative and shock absorbing-adhesive layers also may be provided as desired. Two layers of glass, which preferably are laminated together with a liquid adhesive, such as a liquid acrylic resin (methyl methacrylate), to compensate for shape variations in the layers, also may be utilized, and at least one of the glass layers may be normal annealed glass. The rigid mold member may be formed of a hard plastic, such as a polycarbonate material, or another plastic with similar characteristics, for both a noncylindrical curved laminate (i.e., spherically or double curve shaped), and a partially cylindrical laminate. A stainless steel mold member or an elastic, flexible resin-reinforced fiber glass mold member, the latter initially being of flat planar construction with a rectangular cross section, also may be used.

Where a hard plastic is used, the mold member preferably has a Rockwell hardness reading in a range on the order of at least R18 to R35, a heat coefficient of thermal expansion in a range on the order of $3.0 \times 10^{-5}$ to $7.0 \times 10^{-5}$ in./in./°F., a material softening point in a range of not less than 80° C. to 150° C., and a thickness in a range on the order of 1 to 5 mm. Where stainless steel is used, the mold member has a thickness in a range on the order of 0.5 to 2 mm, a heat coefficient of thermal expansion in a range on the order of $0.45 \times 10^{-5}$ to $0.7 \times 10^{-5}$ in./in./°F., and a Rockwell hardness reading in a range on the order of R150 to R200. Similarly, where the flat planar elastic, flexible resin-reinforced fiber glass mold member is used, it may be reinforced with an epoxy, vinylester or graphite resin, and also have a thickness in a range on the order of 1 to 5 mm. The resultant mold member has a heat coefficient of thermal expansion in a range on the order of $15 \times 10^{-6}$, a hardness reading in a range on the order of 86 Shore D at 20° C., a maximum temperature resistance in a range on the order of 220° C. to 300° C., and a tensile strength break point at 150° C. in a range on the order of 128 to 250N/square mm.

The laminate layup-mold member assembly is placed in an autoclave and initially subjected to a vacuum in a range on the order of 0.50 to 0.95 Bar for a time period in a range on the order of 5 to 30 minutes. The assembly then is subjected to a temperature in a range on the order of 80° C. to 150° C. at a pressure in a range on the order of 85 psi to 240 psi, for a time period in a range on the order of 30 to 90 minutes. Finally, the assembly is cooled to a range on the order of 20° C. to 45° C. at the above-mentioned pressure before removing the assembly from the autoclave and then removing the mold member from the formed laminate.

BRIEF DESCRIPTION OF THE DRAWING

FIG. 1 is a schematic cross-sectional representation of a first embodiment of the invention in the form of a noncylindrical curved (i.e., spherically or double curve shaped), shatterproof heat tempered or heat strengthened glass laminate;

FIG. 2 is a schematic cross-sectional representation similar to FIG. 1, illustrating steps in the forming of a noncylindrical curved laminate layup into an integral laminated structure as shown in FIG. 1;

FIG. 3 is a schematic, cross-sectional representation similar to FIG. 2, of a second embodiment of the invention, similarly illustrating steps in the forming of a noncylindrical curved laminate of a different construction than that shown in FIG. 1;

FIG. 4 is a schematic, cross-sectional representation illustrating steps in the forming of a third embodiment of the invention wherein a curved, shatterproof heat tempered or heat strengthened glass laminate has a partial cylindrical configuration;

FIG. 5 is a schematic cross-sectional representation of a noncylindrical curved laminate of a fourth embodiment of the invention similar to FIG. 1, comprising two curved glass layers, which may be of heat strengthened or annealed glass;

FIG. 6 is a schematic cross-sectional representation of a glass layer known as "low E glass" which may be used selectively in any one or all of the embodiments of the invention shown in FIGS. 1–5 and 7–9;

FIG. 7 is a schematic cross-sectional representation of a curved laminate of a fifth embodiment of the invention which may be either cylindrical or noncylindrical and which is particularly suitable for use in windshields;

FIG. 8 is a view similar to FIG. 7 illustrating certain additional modifications therein to form a sixth embodiment of the invention; and FIG. 9 is a schematic cross-sectional view illustrating an elastic, flexible resin-reinforced fiber glass mold member in accordance with a seventh embodiment of the invention.

DETAILED DESCRIPTION OF PREFERRED EMBODIMENT

Referring to FIG. 1, this figure schematically discloses in cross-section, a representation of a noncylindrical curved (i.e., spherically or double curve shaped having a concave/convex shape), shatterproof glass laminate 10 for use in an automotive or other transportation vehicle, such as a bus, truck or train, as a side window, back window or sun roof, each of which for the purpose of this disclosure is considered a "window". The laminate 10 includes a curved sheet or layer of heat tempered or heat strengthened glass 12, which is intended to face outward of the vehicle, a similarly curved antilacerative sheet or layer 14 of a flexible, plastic material, which is intended to face inward of the vehicle, and a curved inner sheet or layer 16 of an elastic, plastic material having both shock or energy absorbing and adhesive characteristics, interposed between the glass layer and the antilacerative layer. Adhesion between the layers 12, 14 and 16 also may be supplemented by additional adhesive, not shown.

More specifically, the antilacerative plastic layer 14 may be formed of a polyester or polycarbonate material, and the combination shock or energy absorbingadhesive plastic layer 16 may be formed of a polyvinyl butyral material. With this specific combination of materials, it has been found that the resultant laminate 10, particularly when polyester is used for the antilacerative layer 14, has excellent optical qualities and also various other desirable characteristics, including high impact, scratch and fire resistance, good adhesion, resistance to solvents and weathering, including yellowing, 99.6% ultraviolet light absorption, and the capability of being made in various colors. However, other materials, having similar characteristics, also may be used. For example, the antilacerative plastic layer 14 also may be formed of a polyurethane, polyacrylate or cellulose acetate material, and the shock absorbing-adhesive layer 16 also may be formed of a polyurethane, an ethylene-vinyl acetate polymer or an ethylene-vinyl acetate triallyl isocyanurate terpolymer.

By use of the materials as above described for the laminate 10, and as a result of the manner in which the laminate is. formed, as subsequently described, the laminate also can be formed to a thickness such that the laminate can be mounted directly in a standard vehicle window frame and/or holder (not shown) without modification, either for the purposes of replacement or in new manufacture. For example, the combined thickness of the laminate layers 12, 14 and 16 can be in a range on the order of 3 to 12 mm, depending upon the make of a particular vehicle. In this connection, the thickness of the glass layer 12 may be in a range on the order of 2.5 to 10 mm; the thickness of the antilacerative plastic layer 14 may be in a range on the order of 0.1 to 0.35 mm, and the thickness of the shock absorbing-adhesive layer 16 may be in a range on the order of 0.25 to 1.5 mm, with the combined thickness of the layers 14 and 16 being in a range on the order of only 0.5 to 2 mm.

In forming the glass laminate 10, in order to achieve optimum optical quality, it is essential to form the antilacerative plastic layer 14 to the exact configuration of the glass layer 12, while simultaneously protecting the antilacerative plastic layer against deformation, and also preventing the formation of air pockets in the shock absorbing-adhesive layer 16, during heat processing. For this purpose, referring to FIG. 2, the glass layer 12, antilacerative layer 14 and shock absorbing-adhesive layer 16 initially are arranged in stacked relationship to form a laminate layup 18. A curved mold member 20 then is positioned against the antilacerative plastic layer 14, and is suitably secured to the laminate layup 18 in pressure engagement with the plastic layer, as for example, along opposite edges of the layup, by special adhesive thermal tape of a known type, not shown, which is resistant to high temperature, such as that available from Northern Fiberglass, Inc. of Hampton, New Hampshire, or Stahl's, Inc. of St. Clair Shores, Mich., to produce a laminate layup-mold member assembly 18, 20. The curved mold member 20, which has been premolded to have the same curvature and topography as the curved glass layer 12, including a smooth molding surface so as to impart a corresponding smooth surface to the antilacerative plastic layer 14, then presses the antilacerative plastic layer tightly against the glass layer through the shock absorbing-adhesive layer 16. As a result, the antilacerative plastic layer 14 will become conformed exactly to the configuration of the glass layer 12, with a smooth inwardly facing molded surface, and the formation of air pockets in the shock absorbing-adhesive layer 16 is prevented during subsequent heating of the laminate layup-mold assembly 18, 20 in an autoclave, not shown, to produce the laminate 10 to the optimum optical quality.

The mold member 20, in addition to having an identical curvature and topography as the heat tempered glass layer 12, is formed of a hard, rigid, structurally stable and quick-releasable material which will not become adhered to the antilacerative plastic layer 14 during heat treatment of the laminate layup 18, so as to be readily removable from the antilacerative plastic layer without damaging the formed laminate 10 and/or the mold member. Further, the mold member 20 is of a material which is not readily subject to breakage, so as to be reusable on a continuous repetitive basis.

For example, where relatively low production volume is contemplated, the mold member 20 preferably is formed from a material which readily can be premolded at low cost, such as polycarbonate or another plastic material with similar characteristics. The mold member 20 also is preferably formed to a thickness in a range on the order of 1 to 5 mm, thus requiring a small amount of space, so that a large number of the laminate-layup mold member assemblies 18, 20 can be processed in the above-mentioned autoclave at one time. From the standpoint of hardness and structural stability, the plastic member 20 also should have a Rockwell hardness reading in a range on the order of at least R18 to R35; a heat coefficient of thermal expansion in a range on the order of $3.0 \times 10^{-5}$ to $7.0 \times 10^{-5}$ in./in./°F., and a material softening point in a range on the order of not less than 80°

C. to 150° C. On the other hand, where relatively large volume production is expected, the mold member 20 may be formed of a suitable metal, such as stainless steel, which, while more difficult and expensive to premold, has a much longer life than plastic, as is subsequently described with reference to the embodiment of FIG. 4.

In forming the glass laminate 10 in the abovementioned autoclave (not shown), the laminate layup-mold member assembly 18, 20 is initially degasified by being subjected to a vacuum in a range on the order of 0.50 Bar to 0.95 Bar, for a time period in a range on the order of 5 to 30 minutes, to evacuate any air from between the glass layer 12, the antilacerative plastic layer 14 and the shock absorbing-adhesive layer 16, and from between the antilacerative layer and the mold member 20. The applying of the vacuum may be accomplished in a known manner, such as by using an autoclave having suitable rubber sealing rings, and/or positioning the assemblies 18, 20 in the autoclave in suitable plastic or rubber vacuum bags (not shown).

The clamped laminate layup-mold member assembly 18, 20 then is subjected to a temperature in a range on the order of 80° C. to 150° C., at a pressure in a range on the order of 85 psi to 240 psi for a time period in a range on the order of 30 to 90 minutes, during which the shock absorbing-adhesive layer 16 is cured to bond the glass layer 12 and the antilacerative plastic layer 14 together. The resultant laminate 10 and mold member 20 then are cooled to a temperature in a range on the order of 20° C. to 45° C. while being maintained under the abovementioned pressure, and removed from the autoclave, whereupon the mold member can readily be separated from the formed laminate for reuse.

FIG. 3 illustrates an alternate embodiment of the invention in which a curved, shatterproof heat tempered or heat strengthened glass laminate 10' is formed from a laminate layup 18' comprising a curved heat tempered or heat strengthened glass layer 12', a first antilacerative layer 14', a first shock absorbing-adhesive layer 16' at least a second antilacerative inner plastic layer 22, and at least a second shock absorbing-adhesive layer 24, it being apparent that additional ones of the layers 22 and 24 may be provided as desired. In forming the laminate layup 18' into the glass laminate 10', the antilacerative plastic layer 14' is pressure-engaged by a curved mold member 20' which has the same characteristics as described above with reference to FIGS. 1 and 2, and which is suitably clamped to the laminate layup 18' in the same manner, as for example, by high temperature resistant adhesive tape, not shown. In this embodiment, by fabricating the antilacerative plastic layers 14', 22 and the shock absorbing-adhesive layers 16', 24 with a combined thickness in a range on the order of 2 to 8 mm, and by interposing several of the antilacerative plastic and shock absorbing-adhesive layers (preferably more than two of each), the laminate 10' can be made of bulletproof construction, at least to low caliber firearms. In other respects, the embodiment of FIG. 3 is essentially identical to the embodiment of FIGS. 1 and 2.

FIG. 4 illustrates a third embodiment of the invention in which a curved, shatterproof heat tempered or heat strengthened glass laminate 10" is formed from a laminate layup 18" with a curvature in the shape of a partial cylinder. As in FIGS. 1 and 2, the laminate layup 18" includes a heat tempered or heat strengthened glass layer 12", a shock absorbing-adhesive layer 16" and an antilacerative plastic layer 14" pressure-engaged by a mold member 20" during formation of the glass laminate 10" under vacuum, heat and pressure in an autoclave, as previously described. In this instance, however, forming of the partially cylindrical glass laminate 10" does not require premolding of the mold member 20", as is the case in the forming of the spherically or double curved mold member 20 in the embodiment of FIGS. 1 and 2. Accordingly, the mold member 20" preferably is formed of a suitable metal having a much longer life than plastic, such as stainless steel, which may have, for example, a thickness in a range on the order of 0.5 to 2 mm, a heat coefficient of thermal expansion in a range in the order of $0.45 \times 10^{-5}$ to $0.70 \times 10^{-5}$ in./in./°F., and a Rockwell hardness reading in a range on the order of R150 to R200.

As to whether the glass layer 12, 12' or 12" is heat tempered or heat strengthened glass as previously described, to those skilled in the art, "heat tempered" glass is considered "fully tempered" glass which has a strength on the order of five to six times that of normal annealed glass, while "heat strengthened" glass is only partially tempered and has a strength on the order of only three times that of normal annealed glass. Frequently, however, more advantageous results can be attained with heat strengthened glass than with heat tempered glass. By way of example, it has been found that heat strengthened glass usually tends to be less subject to breaking than heat tempered or fully tempered glass, breaks into larger pieces when breakage does occur, which is advantageous in some applications, and has better ballistics characteristics, i.e., is more bullet-proof, than heat tempered glass. In other respects, substantially all other factors relating to the practice of the invention remain as above described, with other possible variations as subsequently set forth herein.

For example, referring to FIG. 5, which discloses a fourth embodiment of the invention, as a further alternative, a laminate 10-4 may comprise at least two glass layers 12-4 and 26, preferably heat strengthened and bonded together by an adhesive layer 28, such as a liquid acrylic resin (e.g., methyl methacrylate), or an adhesive film as previously described with reference to the embodiment of FIGS. 1 and 2. In this instance, since the curved shape of the glass layers 12-4 and 26 may not be exactly uniform, the liquid adhesive is preferred for the adhesive layer 28 because the liquid can flow more readily to compensate for any shape variations, as compared to an adhesive film, which generally is of a solid uniformthickness. In the laminate arrangement 10-4, while the glass layers 12-4 and 26 both preferably are heat strengthened or annealed glass, the inner glass layer 12-4 may be heat tempered or annealed glass, with the outer layer 26 being heat strengthened glass.

Referring to FIG. 6, any one of the glass layers 12, 12' 12", 12-4 or 26 in FIGS. 1-5, or the glass layers in subsequently described FIGS. 7, 8 and 9, also may be either a heat tempered, heat strengthened or normal annealed glass layer composite 30, known to those skilled in the art as "low E glass", which is glass produced by bonding a microscopically thin metallic oxide particle coating 32 of electrically conductive metal to one side of a glass layer 34 in an electron emission-type process. The low E glass composite 30 is advantageous because of its capability of reflecting radiant heat back toward its source on the order of a magnitude of five times or more, as compared to non-coated glass. This results in a number of significant advantages over non-coated glass, including (1) reflection of external radiant heat, whereby the heat passing through the glass composite 30 is minimized and the tendency for the plastic layers 14, 14', 14", 14-4 and/or 22 in the laminates 10, 10', 10" and/or 10-4, to soften is reduced, whereby the laminates better retain their shatterproof characteristics; and (2) internal cool air from an air conditioner in an associated vehicle tends to not flow outward through the glass composite 30, thus reducing the amount of air conditioning output required within the vehicle.

FIG. 7 illustrates a fifth embodiment of the invention in the form of a curved laminate 10-5 having features similar to those in the fourth embodiment of the invention shown in FIG. 5, which also is particularly adapted for use in windshields and which may be either cylindrical or noncylindrical, the latter being shown. By way of illustration, in FIG. 7 the laminate comprises at least two glass layers, such as a first glass layer 12-5, which may be of normally annealed glass (AG) as shown, or heat strengthened glass, separated from an antilacerative layer 14-5 of polycarbonate (PC) by a shock absorbing-adhesive layer 16-5 of polyurethane (PU), and from a second outer normally annealed glass layer 26-5 by another shock absorbing-adhesive layer 28-5 of polyvinyl butyral (PVB). In addition, the laminate 10-5 includes first and second layers 38 and 40, respectively, of polyester (PET) material available from E.I. DuPont & Co. of Wilmington, Delaware under the registered trademark Mylar®, or of a similar material, bonded together by an additional intermediate shock absorbingadhesive layer 42 of polyvinyl butyral. In this instance, the first polyester layer 38 bonds to the polycarbonate layer 14-5 during forming of the laminate 10-5 in a vacuum under heat and pressure, as a result of the normally non-adherent surface of the polyester layer which is in engagement with the polycarbonate layer, having been treated during its manufacture in a suitable manner so as to make the surface adherent in nature. At the same time, the polyester layer 38 prevents the shock absorbing-adhesive polyvinyl butyral layer 42 from chemically attacking the polycarbonate layer 14-5. In addition, the outermost polyester layer 40 is provided with a scratch-resistant coating 44SR, such as polyalloxane, exxene or a similar material, to prevent damage thereto during use, or in the alternative, is provided with a known self-healing type of coating in which minor scratches disappear over a period of time.

With reference to FIG. 8, this figure discloses a sixth embodiment of the invention in the form of a curved laminate 10-6 similar to the laminate 10-6 shown in FIG. 7. Thus, the laminate 10-6 comprises at least two normally annealed (or heat strengthened) glass layers 12-6 and 26-6, a polycarbonate layer 14-6, shock absorbingadhesive layers 16-6 and 28-6, inner and outer polyester layers 38-6 and 40-6 having an intermediate shock absorbing-adhesive layer 42-6, and a scratch resistant or self-healing coating 44-6SR on the outer polyester layer. in addition, the laminate 10-6 includes at least a second polycarbonate layer 46 bonded to the first polycarbonate layer 14-6 and the inner polyester layer 38-6 by respective polyurethane shock absorbing-adhesive layers 48 and 50.

With further reference to FIGS. 7 and 8, the laminates 10-5 and/or 10-6 may have a thickness in a range on the order of 4 to 37 mm and 7 to 47 mm, respectively, with the glass layers 12-5, 26-5, 12-6 and 26-6 thereof having a thickness in a range on the order of 1 to 12 mm; the polyvinyl butyral and polyurethane shock absorbing-adhesive layers 16-5, 28-5, 42, 16-6, 28-6, 42-6, 48 and 50 having a thickness in a range on the order of 0.38 to 2 mm; the polycarbonate layers 14-5, 14-6 and 46 having a thickness in a range on the order of 1–6 mm; and the polyester layers 38 and 38-6, and 40 and 40-6 (including the scratch-resistant coatings 44SR and 44-6SR), having a thickness in a range on the order of 0.1 to 0.4 mm. Further, additional layers may be provided in the laminates 10-5 and 10-6, and/or the various layers may be formed of comparable equivalent materials, within the spirit and scope of the invention.

FIG. 9 is a schematic cross-sectional view similar to FIG. 1, illustrating an alternate form of a mold member 20-7 which may be used in practicing the invention, and which is of an elastic, flexible resinreinforced fiber glass laminate construction which does not require premolding. For example, the mold member 20-7 may be used to form a noncylindrical glass laminate 10-7 comprising a glass layer 12-7, an antilacerative layer 14-7 and a shock absorbing-adhesive layer 16-7. For this purpose, the mold member 20-7 may comprise a layer of fiber glass filaments impregnated with a resin such as epoxy, vinylester or graphite, to form the elastic, flexible mold member into a normally flat, planar laminate which is rectangular in cross section, as illustrated at a lower portion of FIG. 9. Then, during processing of the glass laminate 10-7 in an autoclave as previously described, the pressure in the autoclave on the mold member 20-7 causes the mold member to stretch and flex into the curved configuration of the glass laminate, as. illustrated in broken lines in FIG. 9. Subsequently, when the mold member 20-7 is removed from the formed laminate 10-7, the mold member returns essentially to its flat planar rectangular-cross section configuration for reuse. For this purpose, the mold member 20-7 preferably has a thickness in a range on the order of 1 to 5 mm; a heat coefficient of thermal expansion in a range on the order of $15 \times 10^{-6}$ in./in/°F.; a hardness in a range on the order of 86 Shore D at 20° C.; a maximum temperature resistance in a range on the order of 220° C. to 300° C.; and a tensile strength break point at 150° C. in a range on the order of 128 to 250N/squaremm.

In summary, new and improved curved, shatterproof glass laminates for automotive or other transportation vehicle windows, such as the laminates 10, 10', 10" and 10-4 to 10-7, have been disclosed. For example, with reference to FIGS. 1 and 2, the laminate 10 may comprise the heat tempered or heat strengthened glass layer 12, the antilacerative layer 14, formed, for example, of a polyester, polyurethane, polyacrylate, cellulose acetate or polycarbonate plastic material, and the inner combination shock absorbing-adhesive layer 16, formed for example, of polyvinyl butyral, polyurethane, an ethylenevinyl acetate polymer, an ethylene-vinyl acetate triallyl isocyanurate terpolymer, or another adhesive of similar characteristics, all of which cooperate to provide the laminate with the desirable characteristics set forth hereinabove.

Further, the laminate 10 is formed using the mold member 20, which is pressure-engaged with the antilacerative plastic layer 14 of the laminate layup 18 during heat processing, and which is of a hard, rigid, structurally stable and quick-releasable material such that (1) the laminate 10 is accurately formed with excellent opticalqualities; (2) the mold member will not adhere to the antilacerative plastic layer after heat processing has been completed, so as to cause damage to the completed laminate and/or the mold member; (3) the mold member can be of relatively thin construction (e.g., 1 to 5 mm for plastic or 0.5 to 2 mm for stainless steel) so that a relatively large number of the laminates can be processed in an autoclave simultaneously; and (4) the mold member is durable and not readily subject to breakage during use, and thus is reusable on a continuous repetitive basis.

More than one glass layer also may be used, as illustrated in FIG. 5 by the glass layers 12-4 and 26, with the glass layers being of the same or different types, and with the adhesive layer 28 therebetween preferably in liquid formto compensate for curved shape variations in the glass layers. In addition, either glass layer may be formed of the microscopically metallic-coated low E glass 30, as illustrated in FIG. 6, to reduce softening of the associated plastic layer(s) 14, 14', 14", 14-4 and/or 22 (FIG. 3) by external radiant heat, and to reduce air conditioned air loss from within the associated vehicle.

Further, referring to FIG. 7, the curved glass laminate 12-4 in FIG. 5 may be modified to include additional layers, such as the interior polyester layer 38, the additional polyvinyl butyral layer 42, and the exterior polyester layer 40, having the scratch resistant or self-healing coating 44SR, to form the laminate 10-5. The embodiment of FIG. 7 also may be further modified as shown in FIG. 8, to include the additional polycarbonate layer 46 disposed between the additional polyurethane layers 48 and 50.

These and other advantages are achieved, where the laminate is of noncylindrical curved construction and production is expected to be relatively low, as shown in FIGS. 1–3, by forming the mold member of a readily premoldable hard plastic, such as a polycarbonate or another plastic having similar characteristics. On the other hand, where production is expected to be relatively large, or in the case of the partially cylindrical embodiment of the invention shown in FIG. 4, which does not require a premolded member, the mold member may be advantageously formed of a long-life metal, such as stainless steel. The elastic, flexible mold member 20-7 of resin-reinforced fiber glass as shown in FIG. 9 also may be used in place of the hard plastic mold member 20 or 20' (FIGS. 1–3), or the metal mold member 20" (FIG. 4), as desired. As a net result, the curved, shatterproof glass laminates 10, 10', 10" and 10-4 to 10-7 can readily be formed as high quality windshields, side windows, back windows and/or sun roofs for a transportation vehicle, in an economical manner, to provide a means of discouraging vandalism and/or attacks upon the vehicle occupant(s), while also reducing possible personal injury to the vehicle occupant(s) in a collision. The laminates 10, 10', 10" and 10-4 to 10-7 also can be fabricated to a desired configuration and thickness so as to be mountable in an existing vehicle window frame or holder without any substantial modification of the frame or holder, thus further contributing to the economies of the invention.

What is claimed is:

1. A method of forming a curved, shatterproof glass laminate for a vehicle side window, back window or sunroof, which comprises the steps of:

providing a laminate layup comprising a curved outer layer of glass selected from the group consisting of heat tempered and heat strengthened glass, and a curved inner layer of a plastic material in a laminated relationship with a layer of adhesive material therebetween;

positioning a mold member against the layup in pressure engagement against the curved plastic layer in conforming relationship therewith, to protect the plastic layer against deformation and to prevent the formation of air pockets in the adhesive during subsequent heating;

subjecting the assembled laminate layup and mold member to a vacuum and then to heat under pressure to form the laminate;

cooling the formed laminate and the mold member under said pressure; and removing the mold member from the laminate wherein the mold member material is selected from the group consisting of plastic and metal, the plastic having a Rockwell hardness reading in a range on the order of at least R18 to R35, a heat coefficient of thermal expansion in a range on the order of $3.0 \times 10^{-5}$ in./in/°F., and an initial softening point in a range on the order of not less than 80° C. to 150° C., the metal having a thickness in a range on the order of 0.5 to 2 mm, a heat coefficient of thermal expansion in a range on the order of $0.45 \times 10^{-5}$ to $0.7 \times 10^{-5}$ in./in/°F., and a Rockwell hardness reading in a range on the order of R150 to R200.

2. The method as recited in claim 1, wherein the plastic layer material is selected from the group consisting of polyester, polyurethane, polyacrylate, cellulose acetate and polycarbonate.

3. The method as recited in claim 1, wherein the adhesive layer is selected from the group consisting of polyvinyl butyral, polyurethane, an ethylene-vinyl acetate copolymer and an ethylene-vinyl acetate triallyl isocyanurate terpolymer.

4. A method as recited in claim 1, wherein the mold member hard plastic material is polycarbonate.

5. The method as recited in claim 1, wherein:

the assembled laminate layup and mold member are subjected to a vacuum in a range on the order of 0.50 to 0.95 Bar for a time period in a range on the order of 5 to 30 minutes; and the assembled laminate layup and mold member are subjected to a temperature in a range on the order of 80° C. to 150° C. at a pressure in a range on the order of 85 to 240 psi, for a time period in a range on the order of 30 to 90 minutes.

6. The method as recited in claim 5, wherein the formed laminate and the mold member are cooled under said pressure to a temperature in a range on the order of 20° C. to 45° C., before removing the mold member from the laminate.

7. The method as recited in claim 1, wherein the mold member is formed of stainless steel.

8. The method as recited in claim 1, wherein the glass layer has a thickness in a range on the order of 2.5 to 10 mm, the adhesive layer has a thickness in a range on the order of 0.25 to 1.5 mm, and the plastic layer has a thickness in a range on the order of 0.1 to 0.35 mm, with the combined thickness of the adhesive and plastic layers being in a range on the order of 0.5 to 2 mm.

9. The method as recited in claim 1, which further comprises:

providing a second internal layer of adhesive material and a second internal layer of plastic material between the inner and outer layers so that said second layers become bonded to one another and said first-mentioned layers, with said laminate layup having a thickness in a range on the order of 2 to 8 mm.

10. The method as recited in claim 1, wherein a second glass layer is bonded to the outer layer by another layer of adhesive, with the second glass layer further selected from the group consisting of heat tempered, heat strengthened and annealed glass.

11. The method as recited in claim 10, wherein the adhesive layer between the glass layers is of a type which can be used in liquid form to compensate for curved shape variations in the glass layers.

12. The method as recited in claim 11, wherein the adhesive layer between the glass layers is a liquid acrylic resin.

13. The method as recited in claim 12, wherein the liquid acrylic resin is methyl methacrylate.

14. The method as recited in claim 1, wherein at least one glass layer includes a microscopic metallic oxide coating on one side of the glass.

\* \* \* \* \*

UNITED STATES PATENT AND TRADEMARK OFFICE
CERTIFICATE OF CORRECTION

PATENT NO. : 5,622,580
DATED : April 22, 1997
INVENTOR(S) : Jose R. Mannheim

It is certified that error appears in the above-identified patent and that said Letters Patent is hereby corrected as shown below:

Col. 11, line 67, insert -- to $7.0 \times 10^{-5}$ in./in./°F -- after "in a range on the order of $3.0 \times 10^{-5}$ in./in/°F".

Signed and Sealed this

Fourth Day of July, 2000

Attest:

Q. TODD DICKINSON

Attesting Officer

Director of Patents and Trademarks